US012128685B2

(12) United States Patent
Byun et al.

(10) Patent No.: US 12,128,685 B2
(45) Date of Patent: Oct. 29, 2024

(54) INKJET PRINTING DEVICE

(71) Applicant: Samsung Display Co., Ltd., Yongin-Si (KR)

(72) Inventors: Jung Woong Byun, Osan-si (KR); Toshinaru Suzuki, Suwon-si (KR); Cheong-Wan Min, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 101 days.

(21) Appl. No.: 17/834,033

(22) Filed: Jun. 7, 2022

(65) Prior Publication Data

US 2023/0084045 A1 Mar. 16, 2023

(30) Foreign Application Priority Data

Sep. 14, 2021 (KR) ........................ 10-2021-0122329

(51) Int. Cl.

| | |
|---|---|
| ***B41J 2/145*** | (2006.01) |
| ***B41J 2/14*** | (2006.01) |
| ***B41J 25/00*** | (2006.01) |
| ***B41J 25/308*** | (2006.01) |
| ***B41J 25/316*** | (2006.01) |

(52) U.S. Cl.

CPC ............. *B41J 2/1433* (2013.01); *B41J 2/145* (2013.01); *B41J 25/001* (2013.01); *B41J 25/316* (2013.01); *B41J 25/003* (2013.01); *B41J 25/308* (2013.01); *B41J 25/3082* (2013.01); *B41J 2202/15* (2013.01)

(58) Field of Classification Search

CPC ........ B41J 2/1433; B41J 2/145; B41J 25/001; B41J 25/316; B41J 25/003; B41J 25/308; B41J 25/3082; B41J 2202/15

See application file for complete search history.

(56) References Cited

U.S. PATENT DOCUMENTS

2017/0217231 A1* 8/2017 Von Essen ............. B41J 2/1752

FOREIGN PATENT DOCUMENTS

| | | | | |
|---|---|---|---|---|
| JP | 2011194773 A * | 10/2011 | ................ | B41J 2/01 |
| KR | 10-0706940 B1 | 4/2007 | | |
| KR | 10-2008-0009542 A | 1/2008 | | |
| KR | 10-0811231 B1 | 3/2008 | | |
| KR | 10-2021-0070290 A | 6/2021 | | |

* cited by examiner

*Primary Examiner* — Yaovi M Ameh
(74) *Attorney, Agent, or Firm* — Innovation Counsel LLP

(57) ABSTRACT

An inkjet printing device according to the present embodiment includes an alignment plate, a substrate positioned on one surface in a third direction of the alignment plate, and an inkjet head combined with the substrate, wherein the alignment plate includes a first position adjustor positioned on a first side surface in a first direction of the alignment plate, and a second position adjustor, a third position adjustor, a fourth position adjustor, a fifth position adjustor, and a sixth position adjustor positioned at a second side surface in a second direction of the alignment plate, and each of the position adjustors adjusts the position of the substrate.

20 Claims, 19 Drawing Sheets

INKJET PRINTING DEVICE

CROSS-REFERENCE TO RELATED APPLICATION

This application claims priority to and the benefit of Korean Patent Application No. 10-2021-0122329 filed in the Korean Intellectual Property Office on Sep. 14, 2021, the entire contents of which are incorporated herein by reference.

BACKGROUND

(a) Technical Field

The present disclosure generally relates to an inkjet printing device. More particular, the present disclosure relates to an inkjet printing device having multi axis of the inkjet head and increasing a degree of integration of the inkjet head.

(b) Description of the Related Art

Display devices are increasing in importance along with development of multimedia. In response to this, various types of display devices such as an organic light emitting device (OLED) and a liquid crystal display (LCD), and the like, are being used.

As a device that displays an image of a display device, a display panel such as an organic light emitting panel or a liquid crystal panel is included. Among them, a light emitting display panel may include a light-emitting element, and for example, in a case of a light emitting diode (LED), there are an organic light emitting diode (OLED) using an organic material as a fluorescent material and an inorganic light emitting diode (LED) using an inorganic material as a fluorescent material.

Meanwhile, an inkjet printing device may be used to transfer an inorganic photo luminescent diode or to form an organic material layer included in the display device. After printing any ink or solution with an inkjet printing device, a post-processing process may be performed to transfer the inorganic photo luminescent diode or to form an organic material layer. The inkjet printing device may perform processes of supplying a predetermined ink or a solution to an inkjet head, and spraying the ink or the solution onto a predetermined substrate through the inkjet head.

The above information disclosed in this Background section is only for enhancement of understanding of the background of the present disclosure, and therefore it may contain information that does not form the prior art that is already known in this country to a person of ordinary skill in the art.

SUMMARY

Example embodiments are to provide an inkjet printing device having 6-axis individual alignment of the inkjet head and increasing a degree of integration of the inkjet head.

An inkjet printing device according to an example embodiment includes: an alignment plate; a substrate positioned on one surface of the alignment plate in a third direction; and an inkjet head disposed on the substrate, wherein the alignment plate includes: a plurality of position adjustors having a first position adjustor positioned on a first side surface of the alignment plate in a first direction; and a second position adjustor, a third position adjustor, a fourth position adjustor, a fifth position adjustor, and a sixth position adjustor positioned at a second side surface of the alignment plate in a second direction perpendicular to the first direction, and each of the position adjustors individually adjusts the position of the substrate.

A first ball directly connected to the first position adjustor and in contact with a first side surface of the substrate, a second ball directly connected to the second position adjustor and in contact with a second side surface of the substrate, and a third ball directly connected to the third position adjustor and in contact with the second side surface of the substrate may be further included, and motion directions of the first position adjustor, the second position adjustor, and the third position adjustor and the motion directions of the first ball, the second ball, and the third ball may be the same.

A fourth ball connected to the fourth position adjustor through a connecting member and in contact with a rear surface of the substrate in a third direction perpendicular to the first direction and the second direction, a fifth ball connected to the fifth position adjustor through a connecting member and in contact with the rear surface of the substrate in the third direction of the alignment plate, and a sixth ball connected to the sixth position adjustor through a connecting member and in contact with the rear surface of the substrate of the alignment plate in the third direction may be further included, and motion directions of the fourth position adjustor, the fifth position adjustor, and the sixth position adjustor and motion directions of the fourth ball to the sixth ball may be perpendicular to each other.

The first position adjustor, the second position adjustor, and the third position adjustor may adjust linear movement of the substrate in the first direction and in the second direction, and rotational movement of the substrate about the third direction.

The fourth position adjustor, the fifth position adjustor, and the sixth position adjustor may adjust rotational movement of the substrate about the first direction and about the second direction, and may adjust linear movement of the substrate in the third direction.

The substrate and the inkjet head may be connected through a connection bracket, and a position of the inkjet head may be adjusted through a position adjustment of the substrate.

The first, second, third, fourth, fifth, and sixth position adjustors may be moved vertically in an axis direction of the position adjustor.

The first, second, third, fourth, fifth, and sixth position adjustors may be controlled automatically or manually.

The inkjet head may include a spraying nozzle positioned on the third side surface of the alignment plate in the second direction, and an injection nozzle and a control cable connected to the inkjet head.

Each of the first, second, third, fourth, fifth, and sixth position adjustors may be respectively connected to a hydraulic pressure cable, and each position adjustor may rise or fall through a pressure applied to the hydraulic pressure cable.

The second position adjustor and the third position adjustor may be positioned in a same column, and the fourth position adjustor, the fifth position adjustor, and the sixth position adjustor may be positioned in the same column.

An inkjet printing device according to another example embodiment includes a plurality of inkjet printing units overlapping in a third direction, wherein each inkjet printing unit includes: an alignment plate; a substrate positioned on one surface of the alignment plate in the third direction; and an inkjet head disposed on the substrate, and the alignment plate includes: a plurality of position adjustors having a first position adjustor positioned at a first side surface of the alignment plate in a first direction perpendicular to the third direction; and a second position adjustor, a third position adjustor, a fourth position adjustor, a fifth position adjustor, and a sixth position adjustor positioned as a second side surface of the alignment plate in a second direction perpendicular to the first direction and third direction, and each of the position adjustors adjusts position of the substrate.

A first ball directly connected to the first position adjustor and in contact with a first side surface of the substrate, a second ball directly connected to the second position adjustor and in contact with a second side surface of the substrate, and a third ball directly connected to the third position adjustor and in contact with the second side surface of the substrate may be further included, and motion directions of the first position adjustor, the second position adjustor, the third position adjustor, and motion directions of the first ball to the third ball may be the same.

A fourth ball connected to the fourth position adjustor through a connecting member and in contact with a rear surface of the substrate in the third direction, a fifth ball connected to the fifth position adjustor through a connecting member and in contact with the rear surface of the substrate of the alignment plate in the third direction of the substrate, a sixth ball connected to the sixth position adjustor through a connecting member and in contact with the rear surface of the substrate of the substrate in the third direction may be further included, and motion directions of the fourth position adjustor, the fifth position adjustor, the sixth position adjustor and motion directions of the fourth ball to the sixth ball may be perpendicular to each other.

The first position adjustor, the second position adjustor, and the third position adjustor may adjust linear movement of the substrate in the first direction and in the second direction and rotational movement of the substrate about the third direction.

The fourth position adjustor, the fifth position adjustor, and the sixth position adjustor may adjust rotational movement of the substrate about the first direction and the second direction, and linear movement of the substrate in the third direction.

The substrate and the inkjet head may be connected through a connection bracket, and position of the inkjet head may be adjusted through position adjustment of the substrate.

position of the inkjet head of each inkjet printing unit may be independently controlled.

at least two inkjet printing units may be overlapped in the third direction.

The inkjet head may include a spraying nozzle positioned at a third side surface of the alignment plate in the second direction, and an injection nozzle and a control cable connected to the inkjet head.

According to example embodiments, an inkjet printing device capable of 6-axis individual alignment of the inkjet head and increasing the degree of integration may be provided.

BRIEF DESCRIPTION OF THE DRAWINGS

FIG. 12 is a perspective view from a side surface, and FIG. 13 is a view showing a front surface.

DETAILED DESCRIPTION OF THE EMBODIMENTS

Figure 1:
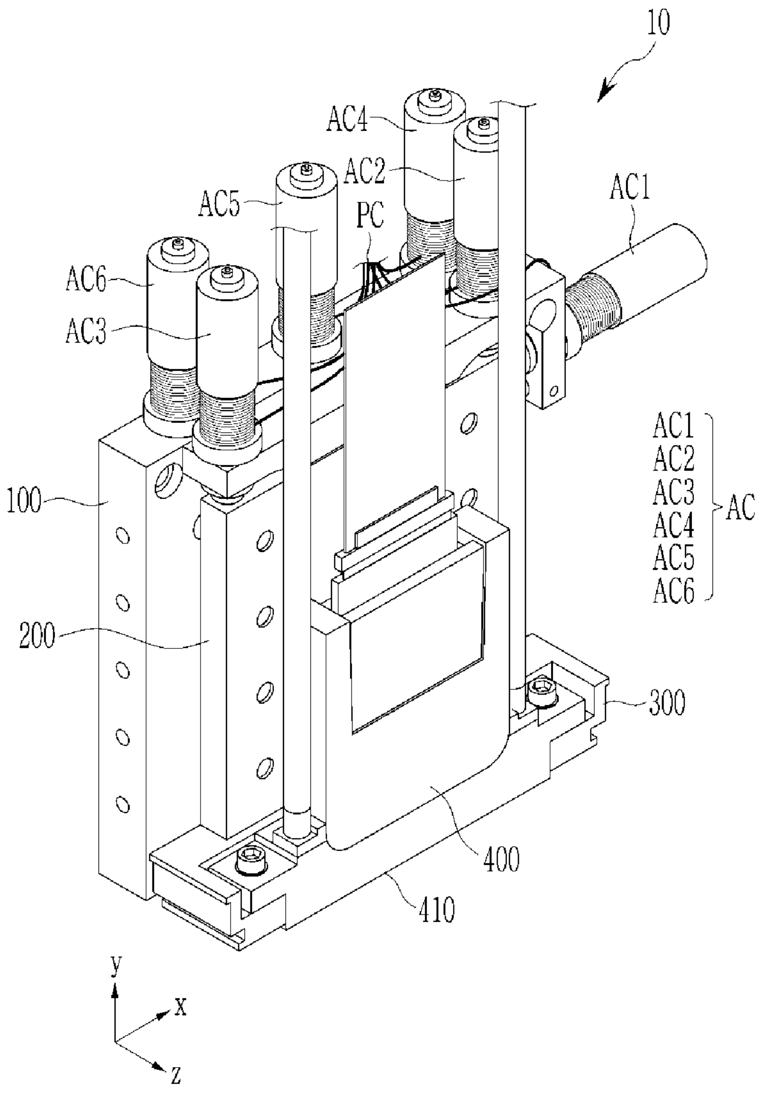
FIG. 1 is a view showing an inkjet printing device according to the present embodiment.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure.

Descriptions of parts not related to the present disclosure are omitted, and like reference numerals designate like elements throughout the specification.

Further, since sizes and thicknesses of constituent members shown in the accompanying drawings are arbitrarily given for better understanding and ease of description, the present disclosure is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Throughout the specification, the phrase "on a plane" means viewing the object portion from the top, and the phrase "on a cross-section" means viewing a cross-section of which the object portion is vertically cut from the side.

Hereinafter, an inkjet printing device according to an example embodiment of the present disclosure is described in detail with reference to drawings below.

FIG. 1 is a view showing an inkjet printing device according to the present embodiment. Referring to FIG. 1, an inkjet printing device 10 includes an alignment plate 100, a plurality of position adjustors AC, a substrate 200 connected to the alignment plate 10), a connection bracket 300 connected to the substrate 200, and an inkjet head 400 connected to the connection bracket 300.

As shown in FIG. 1, the inkjet printing device 10 according to the present embodiment includes six position adjustors AC1, AC2, AC3, AC4, AC3, and AC6. This position adjustor AC may control the inkjet head 400 in three linear movements Tx, Ty, and Tz in a first direction X, a second direction Y, and a third direction Z, and three rotational movements Rx, Ry, and Rz about the first direction X, the second direction Y, and the third direction Z. The position adjustor AC is connected to the hydraulic pressure cable PC and may be operated via a hydraulic pressure cable PC.

Figure 2:
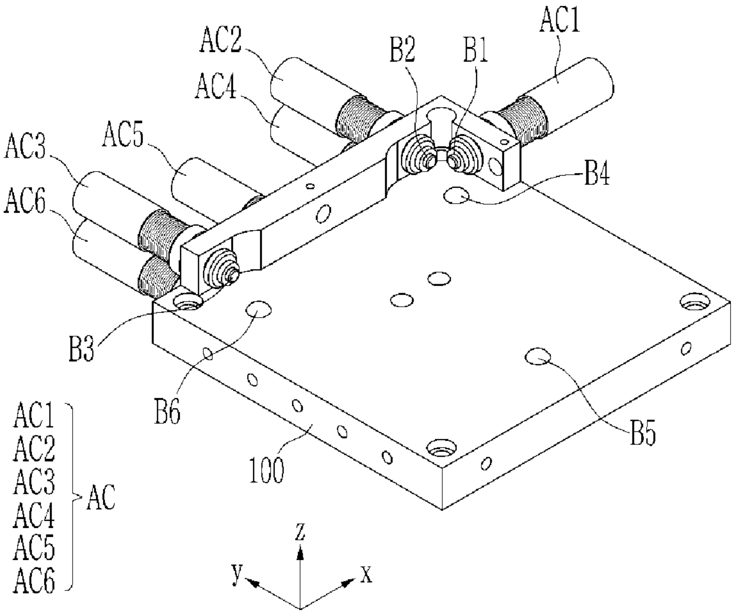
FIG. 2 is a view showing an alignment plate according to the present embodiment.

Then, the alignment plate 100 is described in more detail below. FIG. 2 is a view showing an alignment plate 100 according to the present embodiment.

Referring to FIG. 2, the alignment plate according to the present embodiment includes the first position adjustor AC1, the second position adjustor AC2, the third position adjustor AC3, the fourth position adjustor AC4, the fifth position adjustor AC5, and the sixth position adjustor AC6. Although omitted in FIG. 2, each position adjustor AC may be connected to the hydraulic pressure cable PC as shown in FIG. 1. Each position adjustor AC may be raised or lowered through pressure applied through the hydraulic pressure cable PC. That is, each position adjustor AC may be raised or lowered in each axis direction, and may move in the vertical direction. Each position adjustor AC may be controlled manually or automatically.

Referring to FIG. 2, the first position adjustor AC1 may be positioned on the first side surface in the first direction X of the alignment plate 100. Also, the second position adjustor to the sixth position adjustor AC2, AC3, AC4, AC5, and AC6 may be positioned on the second side surface in the second direction Y of the alignment plate 100.

Simultaneously referring to FIG. 1 and FIG. 2, the spraying nozzle 410 is positioned downward in the second direction Y of the inkjet head 400. At this time, the surface positioned in the first direction X intersecting the second direction Y of the alignment plate 100 is referred to as the first side surface, and the surface positioned in the second direction Y and positioned opposite to the spraying nozzle is referred to as the second side surface. The spraying nozzle 410 may be positioned on the third side surface of the alignment plate 100 in the second direction Y.

Referring to FIG. 2, the first position adjustor AC1 is directly connected to the first ball B1. The second position adjustor AC2 is directly connected to the second ball B2, and the third position adjustor AC3 is directly connected to the third ball B3. Therefore, the position of the substrate 200 may be adjusted while the first ball B1 rises or falls by the vertical movement of the first position adjustor AC1. Similarly, the position of the substrate 200 can be adjusted while the second ball B2 rises or falls due to the rise or fall of the second position adjustor AC2. The third ball B3 also rises or falls by the rising or falling of third position adjustor AC3. As will be described later, since the inkjet head 400 is coupled to the substrate 200, the position of the inkjet head 400 may be adjusted by adjusting the position of the substrate 200.

The first position adjustor to the third position adjustor AC, AC2, and AC3 are directly connected to the first ball to the third ball B1, B2, and B3. The first position adjustor to third position adjustor AC, AC2, and AC3 are involved in the linear movement Tx in the first direction, the linear movement Ty in the second direction, and the rotational movement about the axis of the third direction Rz.

FIGS. 3, 4, 5, 6, 7, 8, 9, 10, and 11 are views showing the movement of the substrate according to the operation of the position adjustor.

Figure 3:
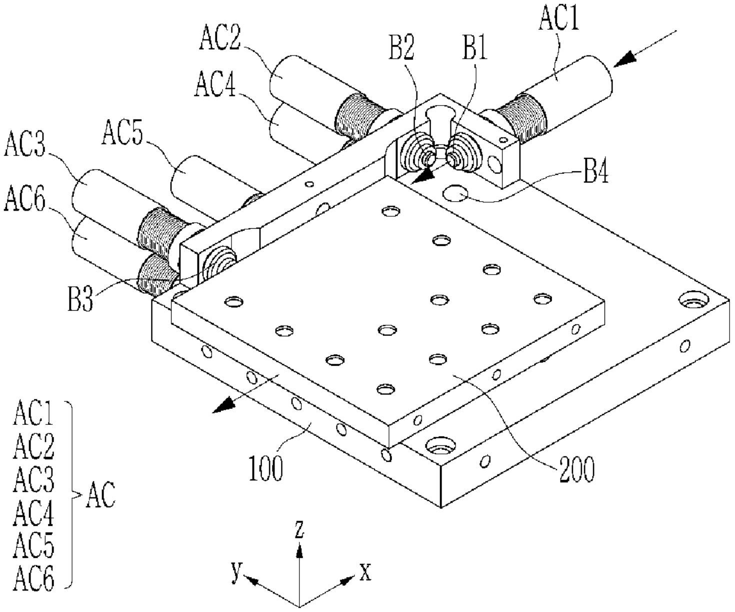
FIGS. 3, 4, 5, 6, 7, 8, 9, 10, and 11 are views showing a movement of a substrate according to an operation of a position adjustor.

Referring to FIG. 3, in the case of the linear movement Tx of the substrate 200 in the first direction X, it may be adjusted by the vertical movement such as the rising or the falling of the first position adjustor AC1.

Figure 4:
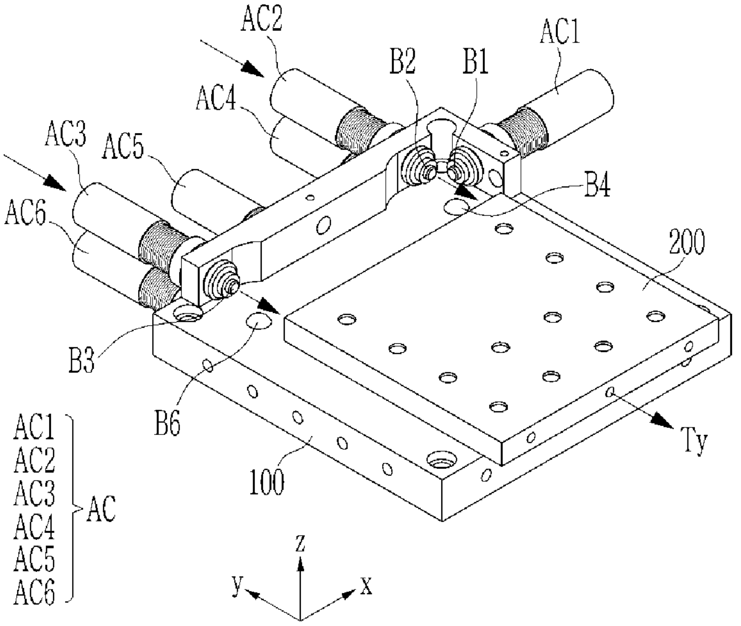

In addition, in the case of the linear movement Ty of the substrate 200 in the second direction Y, as shown in FIG. 4, it may be adjusted by vertical movement such as the rising or the falling of the second position adjustor AC2 and the third position adjustor AC3. At this time, when moving into the linear in the second direction Y, the second position adjustor AC2 and the third position adjustor AC3 must move by the same distance.

Figure 5:
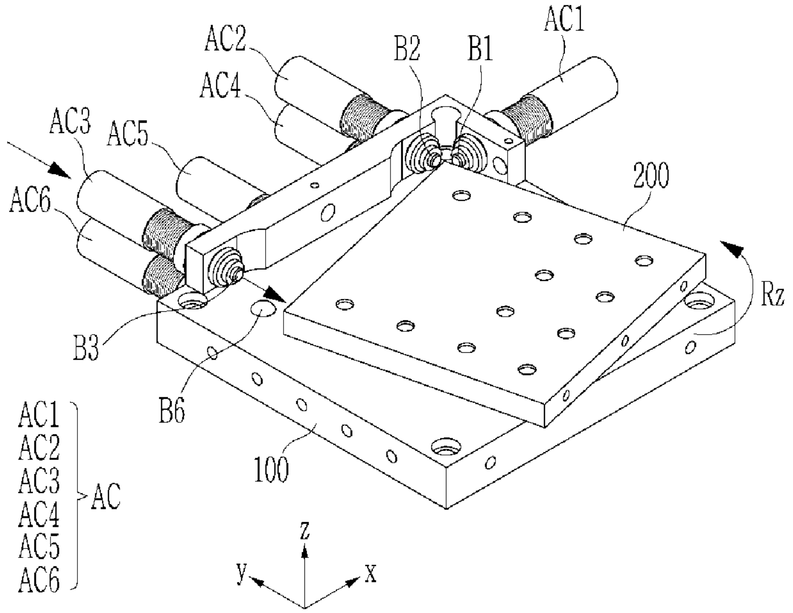
Figure 6:
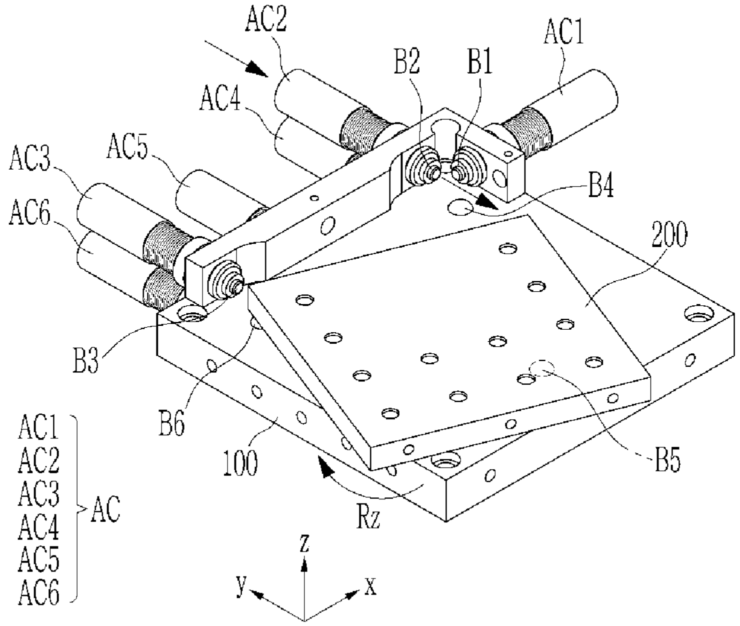

In the case of the rotational movement Rz of the substrate 200 about the axis of the third direction Z, it may be adjusted by varying the momentum of the second position adjustor AC2 and the third position adjustor AC3. That is, as shown in FIG. 5, when the second position adjustor AC2 does not operate and the third position adjustor AC3 operates, the inkjet head may be rotated (Rz) about the third direction as the axis. Also, as shown in FIG. 6, when the second position adjustor AC2 operates and the third position adjustor AC3 does not operate, it may be rotated (Rz) about the third direction as the axis.

In this way, the first position adjustor to the third position adjustor AC1, AC2, and AC3 are directly connected to the first ball B1 to the third ball B3, so that the plane movement Tx in the first direction of the substrate 200, the plane movement Ty in the second direction, and the rotational movement Rz about the axis of the third direction may be adjusted.

Referring back to FIG. 2, the fourth position adjustor AC4 is connected to the fourth ball B4. As shown in FIG. 2, the fourth position adjustor AC4 is not directly connected to the fourth ball B4, but they may be connected by an internal connecting member (not shown). That is, the fourth position adjustor AC4 moves up and down in the second direction Y, but the fourth ball B4 may move up and down in the third direction Z. This is because the movement direction of the fourth position adjustor AC4 is changed by the internal connecting member. This connection is the same for the fifth position adjustor AC5 and the fifth ball B5. That is, the fifth position adjustor AC5 and the fifth ball B5 are connected by a connecting member (not shown) inside the alignment plate 100, and the vertical movement in the second direction Y of the fifth position adjustor AC5 is converted into the up and down movement in the third direction Z of the fifth ball B5.

Similarly, the sixth position adjustor AC6 and the sixth ball B6 are connected by a connecting member (not shown) located inside of the alignment plate 100, and the up and down motion in the second direction Y of the sixth position adjustor AC6) is converted to an up and down motion in the third direction Z of the sixth ball B6.

The fourth position adjustor AC4, the fifth position adjustor AC5, and the sixth position adjustor AC6 are involved in the linear movement Tz in the third direction, the rotational movement Rx about the axis of the first direction, and the rotational movement Ry about the axis of the second direction.

Figure 7:
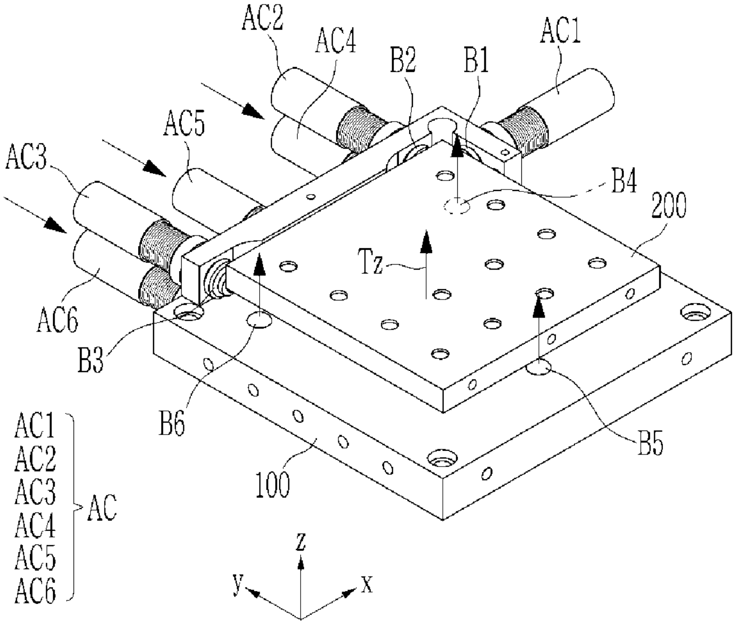

Referring to FIG. 7, the fourth ball B4, the fifth ball B5, and the sixth ball B6 are moved in the third direction Z by the vertical movement of the fourth position adjustor AC4, the fifth position adjustor AC5, and the sixth position adjustor AC6 in the second direction Y. Therefore, the substrate 200 (the inkjet head positioned on the fourth ball B4, the fifth ball B5, and the sixth ball B6) may move in the third direction Z.

Figure 8:
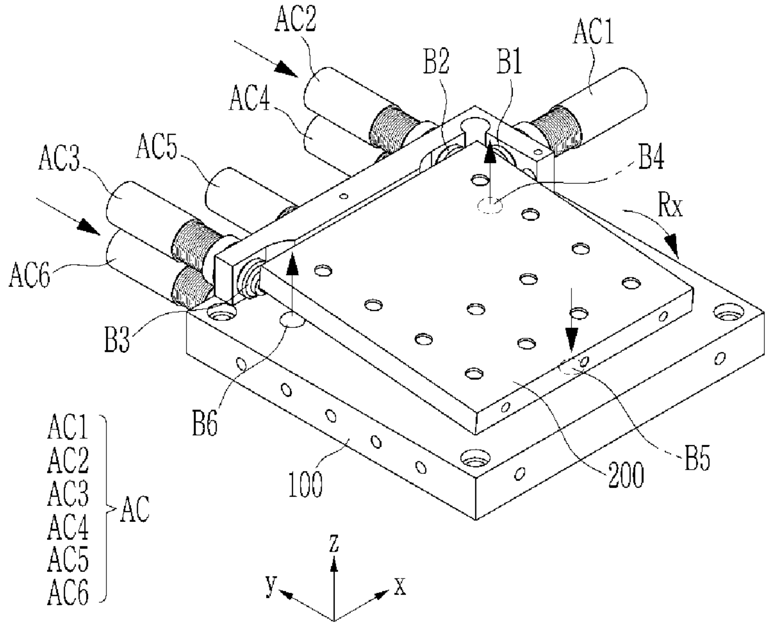
Figure 9:
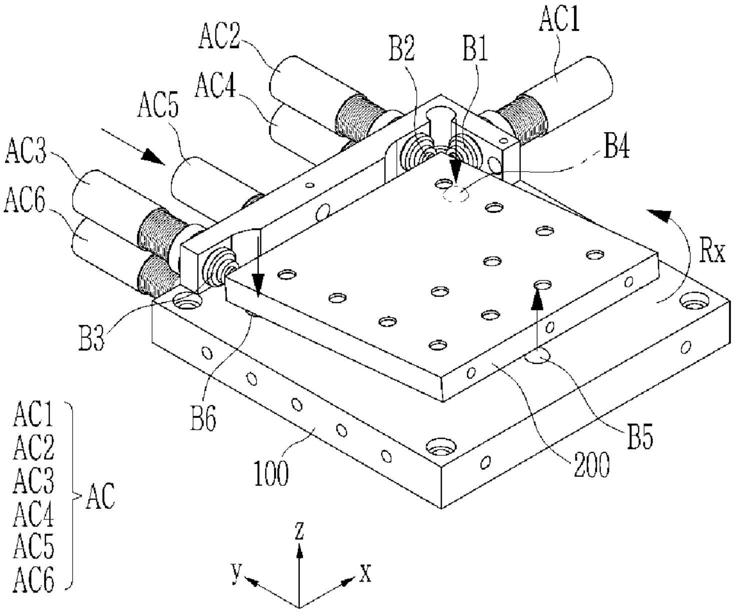

Referring to FIG. 8, when each of the fourth ball B4 and the sixth ball B6 rises and the fifth ball B5 descends, the substrate 200 rotates (Rx) about the first direction X as the axis. Similarly, in FIG. 9, when each of the fourth ball B4 and the sixth ball B6 descends and the fifth ball B5 rises, the substrate 200 may rotate (Rx) about the first direction X as the axis.

Figure 10:
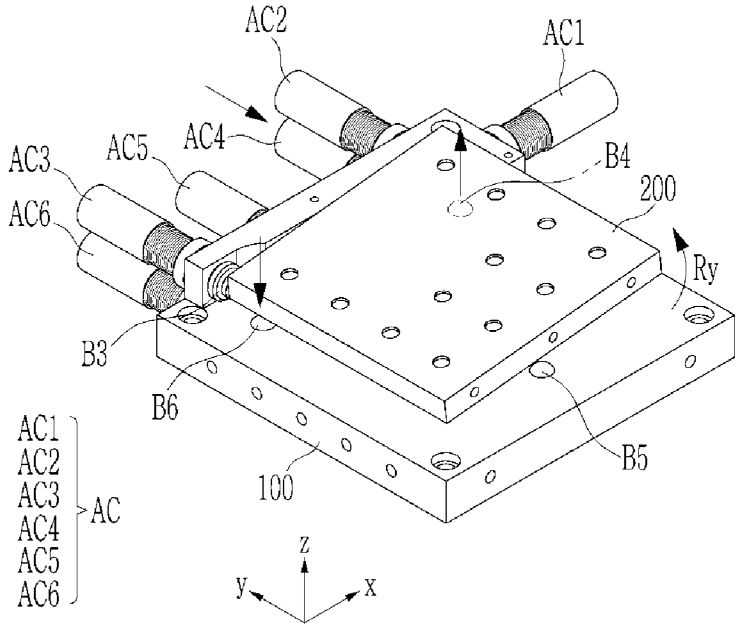
Figure 11:
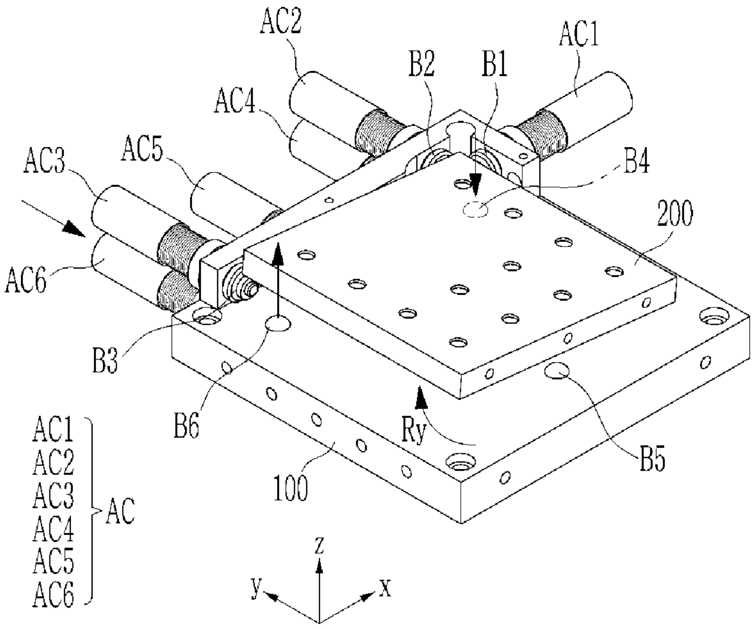

Referring to FIG. 10, when the fourth ball B4 rises and the sixth ball B6 descends, the substrate 200 may rotate (Ry) about the second direction Y as the axis. Similarly, in FIG. 11, when the fourth ball B4 descends and the sixth ball B6 rises, the substrate 200 may rotate (Ry) about the second direction Y as an axis.

In this way, each of the fourth position adjustor to the sixth position adjustor AC4, AC5, and AC6 are respectively connected to the fourth ball to the sixth ball B4, B5, and B6 through the connecting member that converts the motion direction, and are involved in the linear movement Tz in the third direction of the inkjet head, the rotational movement Rx about the first direction X as the axis, and the rotational movement Ry in the second direction Y as the axis.

In this way, the alignment plate 100 according to the present embodiment includes six position adjustors AC, and through these six position adjustors, the substrate 200 and the inkjet head connected thereto may be straight-line moved and rotated in all directions. That is, the inkjet head may move with three linear movements in the first, second, and third directions Tx, Ty, and Tz, and move with three rotational movements about the first, second, and third directions Rx, Ry, and Rz about the first direction X, the second direction Y, and the third direction Z. Therefore, precise alignment of the inkjet head is possible.

In addition, as depicted in FIG. 1, in the present embodiment, despite including six position adjustors, the five position adjustors are positioned on the second side surface of the alignment plate 100 in the second direction, and one position adjustor is positioned on the first side surface of the alignment plate 100 in the first direction. Therefore, a plurality of inkjet printing devices may be overlapped and used in the third direction, and a large display may be precisely manufactured with high resolution. The inkjet printing device in which a plurality of inkjet printing units are combined is separately described later.

Figure 12:
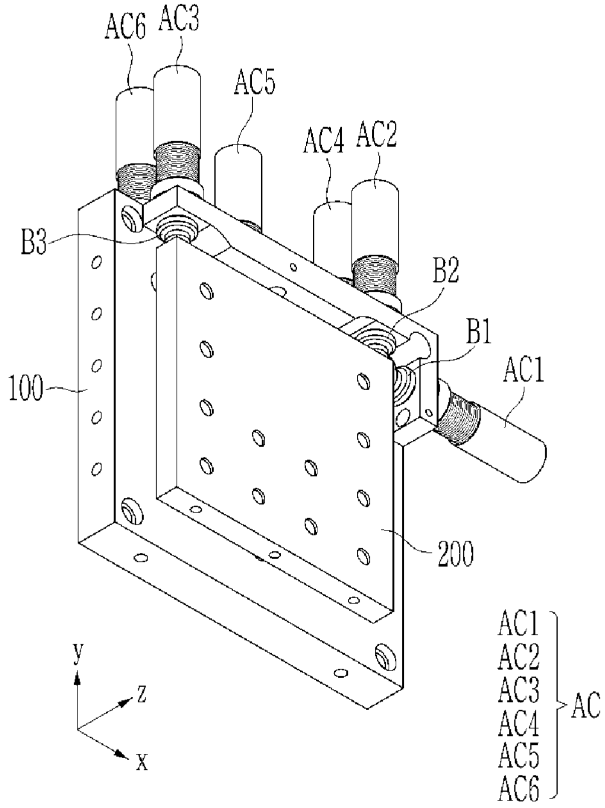
FIGS. 12 and 13 are views showing a configuration of an alignment plate and a substrate of an inkjet printing device.
Figure 13:
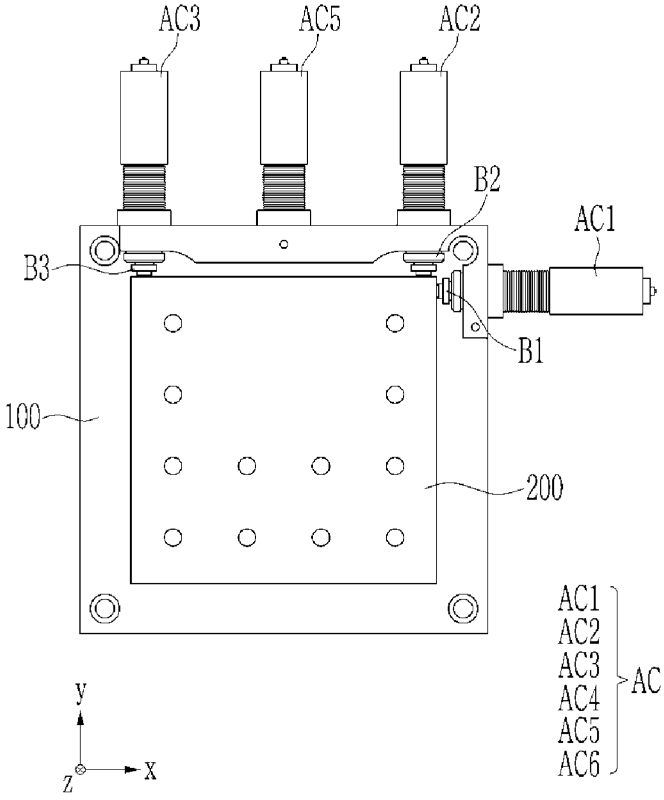

FIGS. 12 and 13 show the configuration of the alignment plate 100 and the substrate 200 of the inkjet printing device 10. FIG. 12 is a perspective view from the side surface, and FIG. 13 shows the front surface. Referring to FIGS. 12 and 13, the first ball to the sixth ball B1, B2, B3, B4, B5, and B6 of the alignment plate 100 and the substrate 200 are in direct contact. Accordingly, the movement of the first ball to the sixth ball B1, B2, B3, B4, B5, and B6 through the operation of the first position adjustor to the sixth position adjustor AC1, AC2, Ac3, AC4, AC5, and AC6 is transmitted to the substrate 200.

The first position adjustor to the sixth position adjustor AC1, AC2, AC3, AC4, AC5, and AC6 adjust and align the position of the substrate 200 in the same principle as described in FIGS. 2, 3, 4, 5, 6, 7, 8, 9, 10, and 11. As described later, the inkjet head is coupled to the substrate 200, so that the position alignment of the substrate 200 may be aligned with the inkjet head.

As shown in FIGS. 12 and 13, the first ball B1, the second ball B2, and the third ball B3 may be in contact with the first side surface of the substrate 200 in the first direction X and the second side surface in the second direction Y, and the fourth ball B4, the fifth ball B5, and the sixth ball B6 may be in contact with the rear surface of the substrate 200 in the third direction Z.

Figure 14:
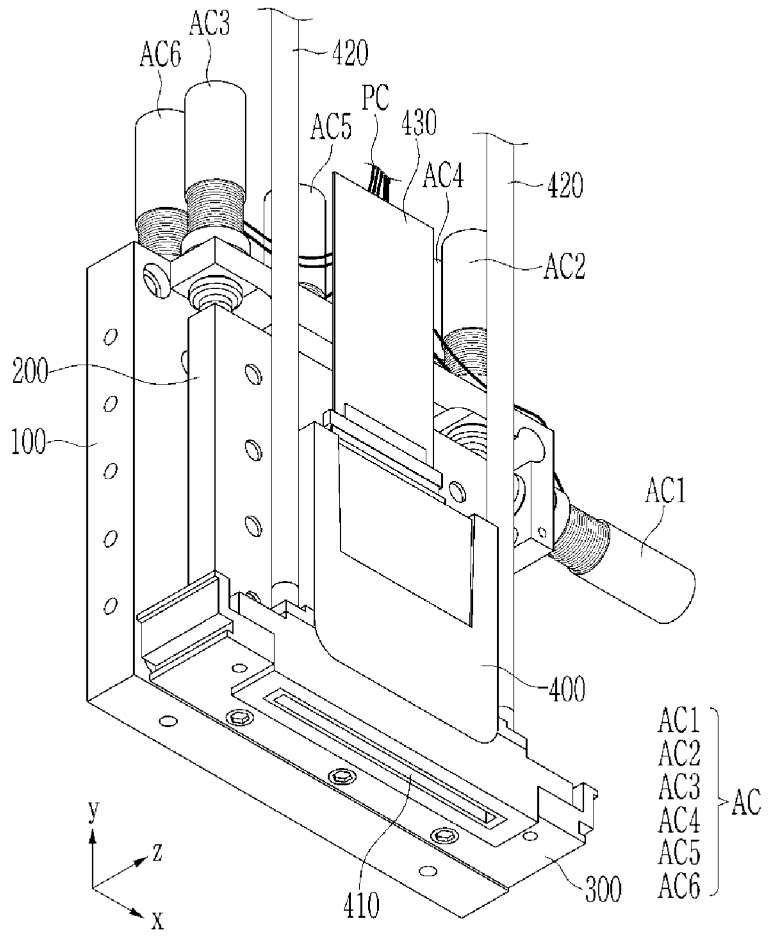
FIGS. 14 and 15 are views showing an alignment plate including an alignment plate, a substrate, a connection bracket, and an inkjet head.
Figure 15:
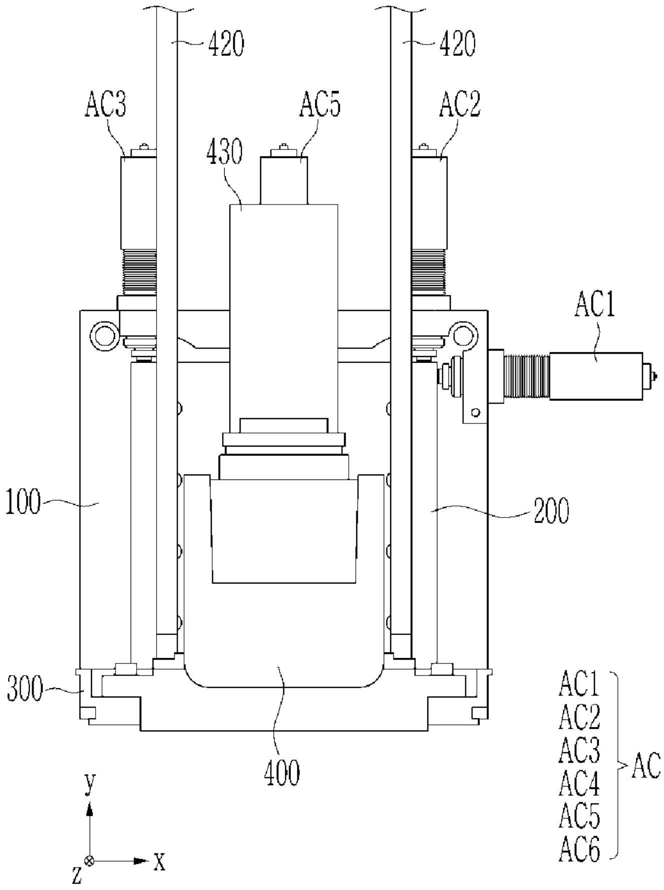

FIGS. 14 and 15 are views showing the alignment plate 100, the substrate 200, the connection bracket 300, and the alignment plate 100 including the inkjet head 400.

FIG. 14 is a perspective view from the side surface, and FIG. 15 shows the front surface. Referring to FIGS. 14 and 15, the connection bracket 300 and the inkjet head 400 are coupled to the substrate 200.

Figure 16:
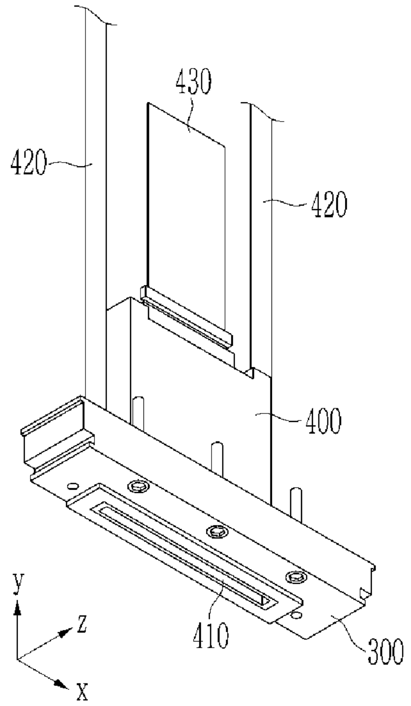
FIGS. 16 and 17 are views showing a connection of a connection bracket and an inkjet head.
Figure 17:
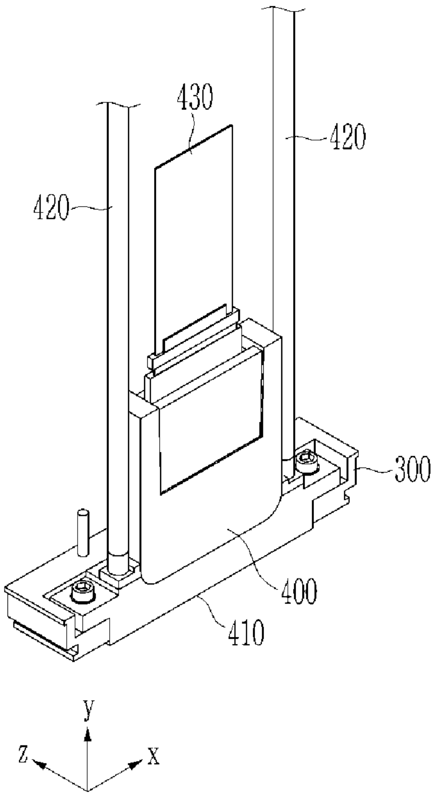

FIGS. 16 and 17 are views showing the connection of the connection bracket 300 and the inkjet head 400. Referring to FIGS. 16 and 17, the inkjet head 400 is connected to the connection bracket 300. The spraying nozzle 410 to which an ink is sprayed from the inkjet head 400 is positioned below the inkjet head 400 in the second direction Y. The supply nozzle 420 to which the ink is supplied may be positioned on both sides of the inkjet head 400. Also, as shown in FIGS. 15 and 16, a control cable 430 for controlling the inkjet head 400 may be combined with the inkjet head 400 located at the opposite side of the spraying nozzle 410.

Referring to FIGS. 14 and 15, the inkjet head 400 is coupled to the connection bracket 300, and the inkjet head 400 and the connection bracket 300 are coupled to the substrate 200. The spraying nozzle 410 from which the ink is sprayed from the inkjet head 400 may be positioned under the inkjet head 400 in the second direction Y, and the supply nozzle 420 may be positioned on both surfaces of the inkjet head 400 to supply the ink to the inkjet head 400. The control cable 430 is coupled to the inkjet head 400 on the other side of the spraying nozzle 410, and may transmit a control signal to the inkjet head 400.

In this way, the inkjet printing device according to the present embodiment may precisely adjust the position of the inkjet head including six position adjustors for three linear motions and three rotational motions. In addition, 5 of six position adjustors are positioned on the second side surface in the second direction Y, and the other one is positioned on the first side surface in the first direction X, not in the third direction Z, so that the inkjet printing device may be used by overlapping in plural in the third direction Z.

Figure 18:
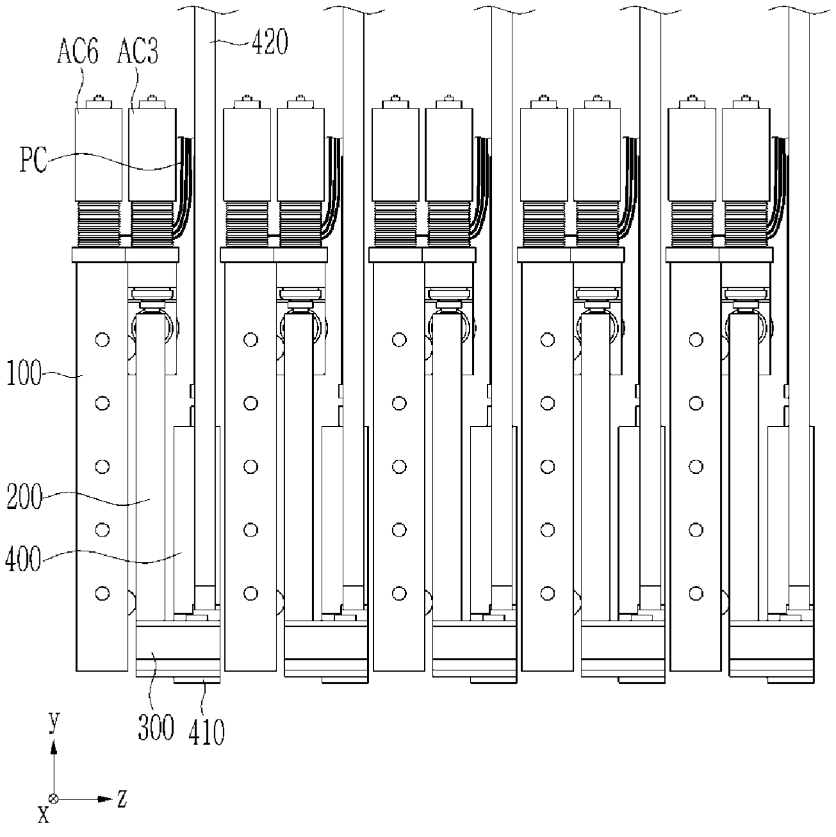
FIGS. 18 and 19 are views showing an inkjet printing device in which a plurality of inkjet printing units are combined.
Figure 19:
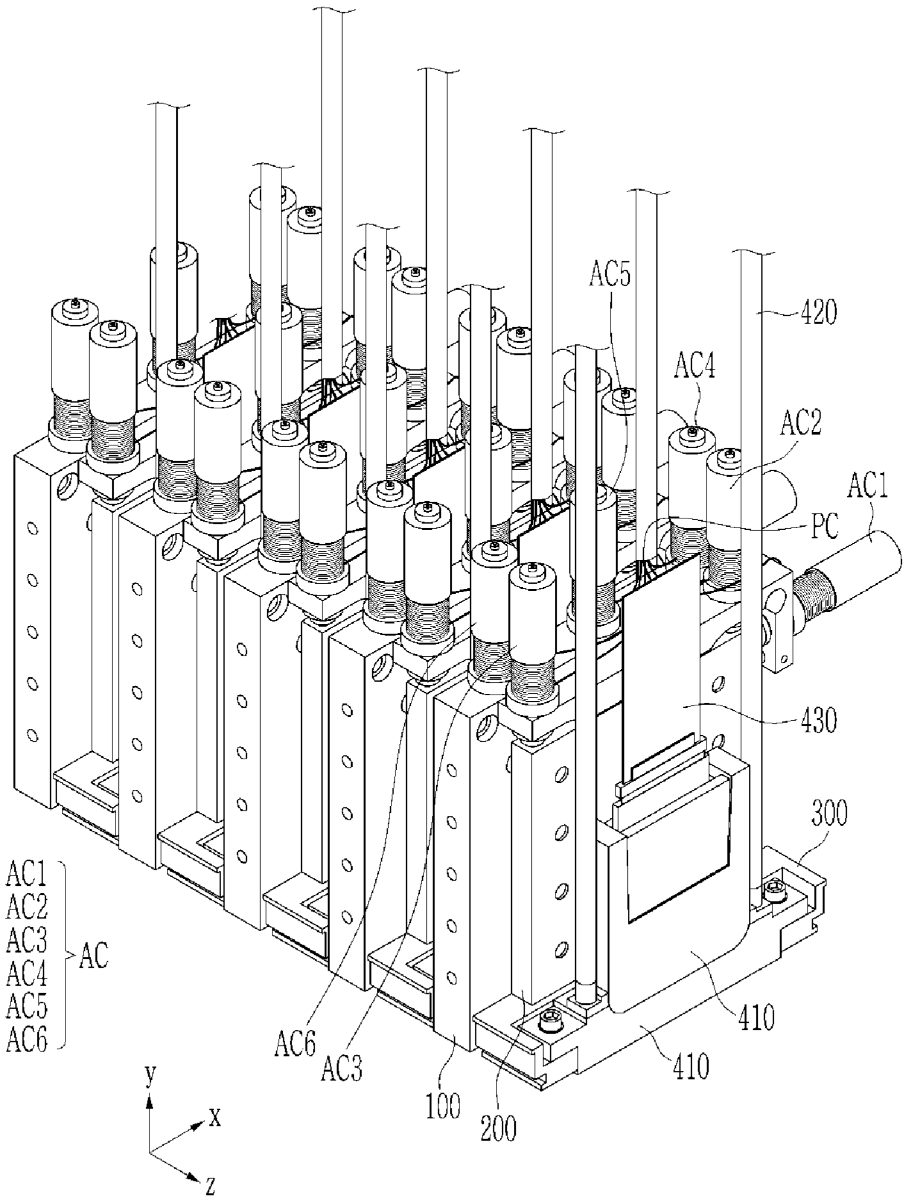

FIGS. 18 and 19 are views showing an inkjet printing device in which a plurality of inkjet printing units are combined. FIGS. 18 and 19 show the same inkjet printing device at different angles. As shown in FIGS. 18 and 19, a plurality of inkjet printing units are overlapped and positioned in the third direction Z. This is because, in the inkjet printing device according to an example embodiment of the present disclosure as described above, the position adjustor is not positioned in the third direction Z, so that a plurality of units may be overlapped in the third direction Z.

In this way, the inkjet printing device in which a plurality of inkjet printing units are combined may increase the printing resolution. That is, since the resolution of the spraying nozzle 410 is limited, it is difficult to increase a DPI (Drop per inch) or a NPI (Nozzle per inch) to more than a certain number. However, the inkjet printing device according to the present embodiment overlaps a plurality of inkjet printing units, and at this time, the spraying nozzle 410 of each inkjet printing unit may fill the space at a regular interval with each other, thereby increasing the printing resolution.

In this case, in each inkjet printing unit, the position adjustor is positioned at other part that is not the first side surface in the first direction and the second side surface in the second direction like the present embodiment, the scale of the inkjet printing device in which the inkjet printing unit is integrated becomes too large, and the distance between the spraying nozzles of each unit increases, so the spraying precision may be reduced. However, in the inkjet printing unit according to the present embodiment, as shown in FIGS. 18 and 19, since the integration arrangement is possible, the volume of the inkjet printing device may be reduced and the ink may be sprayed precisely.

Also, as described above, in the inkjet printing device according to the present embodiment, through six position adjustors, the linear movements Tx, Ty, and Tz in the first, second, and third directions and the rotational movements Rx, Ry, and Rz about the first, second, and third directions as the axis are possible for the inkjet head. Therefore, the position of the inkjet head may be precisely adjusted and the print quality may be improved.

FIG. 18 and FIG. 19 disclose the configuration in which five inkjet printing units are overlapped, but this is only an example, and the number of overlapping inkjet printing units may vary. Five inkjet printing units may constitute one module, and a plurality of modules may be overlapped. The number of the inkjet printing units included in one module may vary.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An inkjet printing device comprising:

an alignment plate;

a substrate positioned on one surface of the alignment plate in a third direction; and an inkjet head disposed on the substrate, wherein the alignment plate includes a plurality of position adjustors having a first position adjustor positioned on a first side surface of the alignment plate in a first direction; and a second position adjustor, a third position adjustor, a fourth position adjustor, a fifth position adjustor, and a sixth position adjustor positioned at a second side surface of the alignment plate in a second direction perpendicular to the first direction, and each of the position adjustors individually adjusts a position of the substrate, wherein each of the plurality of position adjustors is connected to a ball that is in contact with the substrate.

2. A inkjet printing device comprising:

an alignment plate;

a substrate positioned on one surface of the alignment plate in a third direction; and an inkjet head disposed on the substrate, wherein the alignment plate includes a plurality of position adjustors having a first position adjustor positioned on a first side surface of the alignment plate in a first direction; and a second position adjustor, a third position adjustor, a fourth position adjustor, a fifth position adjustor, and a sixth position adjustor positioned at a second side surface of the alignment plate in a second direction perpendicular to the first direction;

each of the position adjustors individually adjusts a position of the substrate;

a first ball directly connected to the first position adjustor and in contact with a first side surface of the substrate;

a second ball directly connected to the second position adjustor and in contact with a second side surface of the substrate; and a third ball directly connected to the third position adjustor and in contact with the second side surface of the substrate, wherein motion directions of the first position adjustor, the second position adjustor, and the third position adjustor are equal to motion directions of the first ball, the second ball, and the third ball.

3. The inkjet printing device of claim 2, further comprising:

a fourth ball connected to the fourth position adjustor through a connecting member and in contact with a rear surface of the substrate in a third direction perpendicular to the first direction and the second direction;

a fifth ball connected to the fifth position adjustor through a connecting member and in contact with the rear surface of the substrate in the third direction of the alignment plate; and a sixth ball connected to the sixth position adjustor through a connecting member and in contact with the rear surface of the substrate of the alignment plate in the third direction, and motion directions of the fourth position adjustor, the fifth position adjustor, and the sixth position adjustor are perpendicular to motion directions of the fourth ball, fifth ball, and the sixth ball.

4. The inkjet printing device of claim 3, wherein the first position adjustor, the second position adjustor, and the third position adjustor adjust linear movement of the substrate in the first direction and in the second direction, and rotational movement of the substrate about the third direction.

5. The inkjet printing device of claim 4, wherein the fourth position adjustor, the fifth position adjustor, and the sixth position adjustor adjust rotational movement of the substrate about the first direction and the second direction, and linear movement of the substrate in the third direction.

6. The inkjet printing device of claim 1, wherein the substrate and the inkjet head are connected through a connection bracket, and a position of the inkjet head is adjusted through a position adjustment of the substrate.

7. The inkjet printing device of claim 1, wherein the first position adjustor is moved vertically in the first direction, and the second position adjustor, the third position adjustor, the fourth position adjustor, the fifth position adjustor and the sixth position adjustor are moved vertically in the second direction during adjustment of the position of the substrate.

8. The inkjet printing device of claim 1, wherein the first, second, third, fourth, fifth, and sixth position adjustors are controlled automatically or manually.

9. The inkjet printing device of claim 1, wherein the inkjet head includes a spraying nozzle positioned on the third side surface of the alignment plate in the second direction; and an injection nozzle and a control cable connected to the inkjet head.

10. The inkjet printing device of claim 1, wherein each of the first, second, third, fourth, fifth, and sixth position adjustors is respectively connected to a hydraulic pressure cable, and each position adjustor rises or falls through a pressure applied to the hydraulic pressure cable.

11. The inkjet printing device of claim 1, wherein the second position adjustor and the third position adjustor are positioned in a same column, and the fourth position adjustor, the fifth position adjustor, and the sixth position adjustor are positioned in the same column.

12. An inkjet printing device comprising:

a plurality of inkjet printing units overlapping in a third direction, wherein each inkjet printing unit includes:

an alignment plate;

a substrate positioned on one surface of the alignment plate in the third direction; and an inkjet head disposed on the substrate, wherein the alignment plate includes a plurality of position adjustors having a first position adjustor positioned at a first side surface of the alignment plate in a first direction perpendicular to the third direction, and a second position adjustor, a third position adjustor, a fourth position adjustor, a fifth position adjustor, and a sixth position adjustor positioned as a second side surface of the alignment plate in a second direction perpendicular to the first direction and third direction, and each of the position adjustors adjusts position of the substrate, wherein each of the plurality of position adjustors is connected to a ball that is in contact with the substrate.

13. The inkjet printing device of claim 12, wherein the ball comprises:

a first ball directly connected to the first position adjustor and in contact with a first side surface of the substrate;

a second ball directly connected to the second position adjustor and in contact with a second side surface of the substrate; and a third ball directly connected to the third position adjustor and in contact with the second side surface of the substrate, wherein motion directions of the first position adjustor, the second position adjustor, the third position adjustor are equal to motion directions of the first ball, second ball, and the third ball.

14. The inkjet printing device of claim 13, wherein the ball further comprises:

a fourth ball connected to the fourth position adjustor through a connecting member and in contact with a rear surface of the substrate in the third direction;

a fifth ball connected to the fifth position adjustor through a connecting member and in contact with the rear surface of the substrate of the alignment plate in the third direction;

a sixth ball connected to the sixth position adjustor through a connecting member and in contact with the rear surface of the substrate of the alignment plate in the third direction, and motion directions of the fourth position adjustor, the fifth position adjustor, the sixth position adjustor are perpendicular to motion directions of the fourth ball, fifth ball, and the sixth ball.

15. The inkjet printing device of claim 14, wherein the first position adjustor, the second position adjustor, and the third position adjustor adjust linear movement of the substrate in the first direction and in the second direction, and rotational movement of the substrate about the third direction.

16. The inkjet printing device of claim 15, wherein the fourth position adjustor, the fifth position adjustor, and the sixth position adjustor adjust rotational movement of the substrate about the first direction and the second direction, and linear movement of the substrate in the third direction.

17. The inkjet printing device of claim 12, wherein the substrate and the inkjet head are connected through a connection bracket, and position of the inkjet head is adjusted through position adjustment of the substrate.

18. The inkjet printing device of claim 12, wherein position of the inkjet head of each inkjet printing unit is independently controlled.

19. The inkjet printing device of claim 12, wherein at least two inkjet printing units are overlapped in the third direction.

20. The inkjet printing device of claim 12, wherein:

the inkjet head includes a spraying nozzle positioned at a third side surface of the alignment plate in the second direction; and an injection nozzle and a control cable connected to the inkjet head.

* * * * *